(12) United States Patent
Persson et al.

(10) Patent No.: US 12,370,477 B2
(45) Date of Patent: Jul. 29, 2025

(54) LIQUID COMPOSITION FOR PURIFICATION OF OIL

(71) Applicant: SKF RECONDOIL AB, Stockholm (SE)

(72) Inventors: Thomas Persson, Sandviken (SE); Tomas Östberg, Frösön (SE); Fred Sundström, Stockholm (SE)

(73) Assignee: SKF RECONDOIL AB, Stockholm (SE)

( * ) Notice: Subject to any disclaimer, the term of this patent is extended or adjusted under 35 U.S.C. 154(b) by 0 days.

(21) Appl. No.: 18/633,993

(22) Filed: Apr. 12, 2024

(65) Prior Publication Data

US 2024/0252963 A1    Aug. 1, 2024

Related U.S. Application Data

(62) Division of application No. 17/428,728, filed as application No. PCT/SE2020/050095 on Feb. 3, 2020, now Pat. No. 11,958,004.

(30) Foreign Application Priority Data

Feb. 8, 2019    (SE) .................................. 1950146-9

(51) Int. Cl.
*B01D 37/02* (2006.01)
*B01D 17/02* (2006.01)
(Continued)

(52) U.S. Cl.
CPC ......... *B01D 37/02* (2013.01); *B01D 17/0202* (2013.01); *B01D 37/04* (2013.01);
(Continued)

(58) Field of Classification Search
CPC .... B01D 37/02; B01D 17/0202; B01D 37/04; B01D 39/18; B01D 2201/182;
(Continued)

(56) References Cited

U.S. PATENT DOCUMENTS

| 1,951,739 A | 3/1934 | Rodman et al. |
| 2,023,988 A | 12/1935 | Bissell et al. |

(Continued)

FOREIGN PATENT DOCUMENTS

| CA | 2747909 C | 6/2014 |
| CL | 2021002033 A1 | 1/2022 |

(Continued)

OTHER PUBLICATIONS

Additional translation—i.e. prepared by a translator—of previously submitted Office Action dispatched Jul. 25, 2022 in application No. CN 202080013038.6.

(Continued)

*Primary Examiner* — Ellen M McAvoy
(74) *Attorney, Agent, or Firm* — J-TEK LAW PLLC; Jeffrey D. Tekanic; Scott T. Wakeman

(57) ABSTRACT

A liquid composition for use in purifying an oil contains a polar polymer, a surface active hydrotrope/solubilizer, and a co-tenside. The polar polymer may be a polyalkylene glycol, such as polyethylene glycol. The hydrotrope/solubilizer may be an anionic sulfonic acid, a phosphate ester-based substance or a non-ionic surfactant from the poly-glycoside family. The co-tenside may be at least one amphoteric co-surfactant, such as sodium caprylimino dipropionate.

20 Claims, 2 Drawing Sheets

(51) Int. Cl.
*B01D 37/04* (2006.01)
*B01D 39/18* (2006.01)
*C10M 175/00* (2006.01)
*C10N 70/00* (2006.01)

(52) U.S. Cl.
CPC ....... *B01D 39/18* (2013.01); *C10M 175/0016* (2013.01); *C10M 175/0058* (2013.01); *B01D 2201/182* (2013.01); *B01D 2239/0407* (2013.01); *C10N 2070/00* (2013.01)

(58) Field of Classification Search
CPC .... B01D 2239/0407; C10M 175/0016; C10M 175/0058; C10M 2203/1006; C10M 175/0008; C10M 107/34; C10M 2209/1045; C10M 2209/1055; C10N 2070/00; C10N 2040/08
See application file for complete search history.

(56) References Cited

U.S. PATENT DOCUMENTS

| | | | |
|---|---|---|---|
| 2,049,014 | A | 7/1936 | Mcafee et al. |
| 2,248,131 | A | 7/1941 | Smith |
| 2,435,707 | A | 2/1948 | Bray et al. |
| 3,265,212 | A | 8/1966 | Bonsall |
| 3,304,255 | A | 2/1967 | Kihei et al. |
| 3,930,988 | A | 1/1976 | Johnson |
| 4,028,226 | A | 6/1977 | Forsberg |
| 4,256,578 | A | 3/1981 | Kozar |
| 4,741,840 | A | 5/1988 | Atherton et al. |
| 4,812,234 | A | 3/1989 | Perchthaler et al. |
| 4,948,393 | A | 8/1990 | Hodson et al. |
| 4,990,237 | A | 2/1991 | Heuer et al. |
| 5,053,082 | A | 10/1991 | Flanigan et al. |
| 5,137,654 | A | 8/1992 | Burke |
| 5,154,828 | A | 10/1992 | Schneider et al. |
| 5,269,906 | A | 12/1993 | Reynolds et al. |
| 5,587,065 | A | 12/1996 | Burns |
| 5,948,242 | A | 9/1999 | Ohsol et al. |
| 5,948,271 | A | 9/1999 | Wardwell et al. |
| 5,976,357 | A | 11/1999 | Strom et al. |
| 6,013,174 | A | 1/2000 | Kovacs |
| 6,074,549 | A | 6/2000 | Cochrane et al. |
| 6,132,630 | A | 10/2000 | Briant et al. |
| 6,191,077 | B1 | 2/2001 | Baumgartner et al. |
| 6,379,549 | B1 | 4/2002 | LePoder et al. |
| 6,527,960 | B1 | 3/2003 | Bacon et al. |
| 6,555,014 | B1 | 4/2003 | Bremer et al. |
| 8,816,105 | B2 | 8/2014 | Ristolainen et al. |
| 10,493,383 | B2 | 12/2019 | Teodorescu |
| 10,995,279 | B2 | 5/2021 | Sundström et al. |
| 11,130,075 | B2 | 9/2021 | Sundström et al. |
| 12,097,453 | B2 | 9/2024 | Sundström et al. |
| 2003/0000895 | A1 | 1/2003 | Hensley et al. |
| 2003/0176302 | A1* | 9/2003 | Li ...................... C10M 173/025 508/250 |
| 2005/0059564 | A1* | 3/2005 | Li ....................... C10M 169/04 508/579 |
| 2006/0000787 | A1 | 1/2006 | Galasso et al. |
| 2006/0135377 | A1* | 6/2006 | Li ...................... C10M 173/025 508/389 |
| 2006/0283807 | A1 | 12/2006 | Owen |
| 2007/0241030 | A1 | 10/2007 | Strom |
| 2008/0314821 | A1 | 12/2008 | Ohashi et al. |
| 2009/0078632 | A1 | 3/2009 | Gallo et al. |
| 2010/0204075 | A1* | 8/2010 | da Costa .............. C10M 107/34 508/579 |
| 2011/0174695 | A1 | 7/2011 | Goldman |
| 2011/0213169 | A1 | 9/2011 | Ristolainen et al. |
| 2013/0098805 | A1 | 4/2013 | Bjornson et al. |
| 2014/0224640 | A1 | 8/2014 | Fincher et al. |
| 2014/0332473 | A1 | 11/2014 | Haberman et al. |
| 2015/0072850 | A1 | 3/2015 | Derrick et al. |
| 2015/0152340 | A1 | 6/2015 | Cherney et al. |
| 2015/0224431 | A1 | 8/2015 | Wase |
| 2015/0265955 | A1 | 9/2015 | Kanchi et al. |
| 2015/0283487 | A1 | 10/2015 | Demmel et al. |
| 2015/0322348 | A1 | 11/2015 | Dasgupta |
| 2016/0052799 | A1 | 2/2016 | Grave et al. |
| 2016/0122209 | A1 | 5/2016 | Newman, Jr. |
| 2016/0177198 | A1 | 6/2016 | Mao |
| 2016/0264442 | A1 | 9/2016 | Knoop |
| 2017/0029716 | A1 | 2/2017 | Dasgupta |
| 2017/0190985 | A1 | 7/2017 | Matza |
| 2020/0056102 | A1 | 2/2020 | Sundström et al. |
| 2020/0230520 | A1 | 7/2020 | Sundström et al. |
| 2021/0101094 | A1* | 4/2021 | Sundström ............. C10G 33/08 |
| 2022/0016554 | A1* | 1/2022 | Persson ............ C10M 175/0016 |
| 2022/0096976 | A1 | 3/2022 | Mineo et al. |
| 2022/0111317 | A1* | 4/2022 | Sundström ........... B01D 35/005 |
| 2023/0143845 | A1 | 5/2023 | Enquist et al. |
| 2023/0182050 | A1 | 6/2023 | Oestberg et al. |
| 2024/0286067 | A1* | 8/2024 | Persson .................. B01D 35/12 |

FOREIGN PATENT DOCUMENTS

| | | |
|---|---|---|
| CL | 2021002034 A1 | 1/2022 |
| CN | 85100831 A | 7/1986 |
| CN | 102925275 A | 2/2013 |
| CN | 104662139 A | 5/2015 |
| CN | 105457606 A | 4/2016 |
| CN | 205133522 U | 4/2016 |
| CN | 107158744 A | 9/2017 |
| DE | 19522596 A1 | 1/1997 |
| DE | 102009006586 A1 | 6/2010 |
| DE | 102012219409 A1 | 4/2014 |
| EP | 0693544 A3 | 5/1996 |
| EP | 1561797 A1 | 8/2005 |
| EP | 2181744 A1 | 5/2010 |
| EP | 2900798 B1 | 11/2017 |
| ES | 2374247 A1 | 2/2012 |
| FI | 20105121 A | 8/2011 |
| GB | 500433 A | 2/1939 |
| GB | 547020 A | 8/1942 |
| GB | 758747 A | 10/1956 |
| GB | 1041703 A | 9/1966 |
| GB | 1294861 A | 11/1972 |
| GB | 1450673 A | 9/1976 |
| GB | 2107347 A | 4/1983 |
| GB | 2334034 A | 8/1999 |
| JP | S60135483 A | 7/1985 |
| JP | S6351903 U | 4/1988 |
| JP | 2001239111 A | 9/2001 |
| JP | 2016161464 A | 9/2016 |
| WO | 9840148 A1 | 9/1998 |
| WO | 2014049060 A1 | 4/2014 |
| WO | 2016095009 A1 | 6/2016 |
| WO | 2017196234 A1 | 11/2017 |
| WO | 2018199837 A1 | 11/2018 |
| WO | 2018199838 A1 | 11/2018 |
| WO | 2018199839 A1 | 11/2018 |
| WO | 2020162815 A1 | 8/2020 |
| WO | 2020162816 A1 | 8/2020 |

OTHER PUBLICATIONS

Chemistry and Technology of Oils, China Light Industry Press, Jun. 30, 2001, pp. 664-665, with translation.
Communication dispatched Jul. 21, 2022, in related European application No. 20 706 024.5 and examined claims 1-16.
Communication dispatched Jul. 25, 2022, in related European application No. 20706852.
Communication dispatched Aug. 8, 2023, in related European patent application No. 20 706 024.5, including Opinion and examined claim 1-13.
Handbook of Thermal Engineering vol. 4 Power Plant Chemistry, Xi'an Institute of Thermal Engineering, Ministry of Energy, Water Conservancy and Electric Power Press (1993) p. 615, and English translation thereof.
Human prepared translation of Office Action dispatched Jul. 25, 2022, in related CN application No. 202080013038.6.

(56) References Cited

OTHER PUBLICATIONS

International Search Report and Written Opinion for parent application No. PCT/SE2020/050095.
Regeneration of Waste Lubricating Oil, Information Office of the Comprehensive Research Institute of the Academy of Petrochemical Sciences, Fuel Chemical Industry Publishing House (1974), p. 74, and English translation thereof.
Office Action and Search Report from the Chinese Patent Office dispatched Jul. 25, 2022 in related Chinese application No. 202080013038.6, and translation thereof.
Office Action and Search Report from the Chilean Patent Office dispatched Aug. 18, 2022 in related Chilean application No. CL 202102034, and translation thereof.
Office Action and Search Report from the Chilean Patent Office dispatched Aug. 18, 2022 in related Chilean application No. CL 202102033, and translation thereof.
Office Action and Search Report from the Chinese Patent Office dispatched Jul. 29, 2022 in related Chinese application No. CN 202080012840.3, and translation thereof.
Office Action and Search Report from the Swedish Patent Office dated Aug. 1, 2019 in related Swedish application No. 1950146-9.
Toshio Sakurai, "Petroleum Product Additives", pp. 432-433, Petroleum Industry Press (Nov. 1980), and translation thereof prepared by the Petroleum Product Additives Translation Group.
Office Action from the Chinese Patent Office dispatched Feb. 17, 2023, in related Chinese application No. 202080013038.6, and translation thereof.
Office Action from the Chinese Patent Office dispatched Feb. 24, 2023 in related Chinese application No. 202080012840.3, and translation thereof.
Office Action from the Chinese Patent Office dispatched Jul. 12, 2023, in related Chinese application No. 202080012840.3, and translation thereof.
Office Action from the Chinese Patent Office dispatched Jul. 14, 2023, in related Chinese application No. 202080013038.6, and translation thereof.
Waste Oil Recycling Process, edited by Li Jiwu et al., China Railway Publishing House (1984) pp. 153-154, and English translation thereof.

* cited by examiner

LIQUID COMPOSITION FOR PURIFICATION OF OIL

CROSS-REFERENCE

This application is a divisional application of U.S. patent application Ser. No. 17/428,728 filed on Aug. 5, 2021, now U.S. Pat. No. 11,958,004, which was the U.S. National Stage of International application no. PCT/SE2020/050095 filed on Feb. 3, 2020, which claims priority to Swedish patent application no. 1950146-7 filed on Feb. 8, 2019.

TECHNICAL FIELD OF THE INVENTION

The present invention generally relates to a liquid composition for use in a method and a system for purification of oil.

BACKGROUND OF THE INVENTION

Purification of contaminated oil, such as for example mineral oil, industrial oils, processing oils or hydraulic oils, is important for the possibility to reuse the oils and therefore an important factor for the environmental future and the limited oil natural resources. The contaminated oil can be purified, or recovered, by means of a liquid two-phase separation process, wherein a liquid separation aid is added to the oil and mixed therewith. Impurities will be captured by the separation aid and will accumulate for example in a bottom phase.

SUMMARY

It is one non-limiting object of the present teachings to techniques for improving a liquid composition, e.g., for use in a method and system for the purification of oil.

According to one aspect of the present teachings, a method for purification of oil comprises:
  providing contaminated oil and a liquid separation aid into a mixing tank;
  mixing said separation aid and contaminated oil into a mixture; and
  filtering said mixture.

According to another aspect of the present teachings, a system for purification of oil comprises:
  a mixing tank, said mixing tank comprising a mixing device, at least one inlet for receiving contaminated oil and liquid separation aid and at least one outlet for transferring a mixture of contaminated oil and separation aid out from the mixing tank;
  a separation aid dosing device connected to an inlet of said mixing tank for providing liquid separation aid into said mixing tank; and
  a filtering arrangement connected to the at least one outlet of the mixing tank, whereby said mixture of contaminated oil and separation aid is filtered by said filtering arrangement when transferred out from the mixing tank.

According to another aspect of the present teachings, a computer program product comprises instructions which, when executed by a processor in a control device in a system for purification of oil, cause the control device to perform the method as described above.

By filtering the mixture of contaminated oil and separation aid directly without waiting for the separation aid and contaminants to sediment (settle) to a bottom phase, the purification process is significantly speeded up and valuable time is saved. Furthermore the separation aid contributes to the filtration efficiency. The filter and the separation aid cooperate during the filtering. Contaminants in the contaminated oil are attached to the separation aid during the mixing whereby larger aggregates of separation aid and contaminants are formed. Also very small sized contaminant particles, such as nano sized particles are attached to these aggregates. These large aggregates are then trapped in the filter and any possibly remaining free contaminants in the oil can attach to separation aid and separation aid and contaminant aggregates which are trapped in the filter during the filtering step. of the filter does not necessarily need to be a fine filter, i.e. a filter which is classified as removing the smallest particles but also other filters which are cheaper can be used and still a very good filtration can be achieved where also very small sized contaminant particles will be effectively filtered away by the combined effect of the separation aid and the filter. Here, it is noted that a relatively simple and cheap filter may be used in one aspect of the present teachings and still an exceptional degree of purification can be achieved. However, fine filters can of course also be used in other aspects of the present teachings. Hereby both efficiency and quality in the oil purification process are improved.

In one embodiment of the present teachings, the filtering step comprises filtering said mixture through a depth filter. That is, in this embodiment of the present teachings, the filtering arrangement comprises a depth filter. A depth filter, which also may be called a filter cake, is a filter that can retain impurities within a bulk structure of the filter medium, in contrast to conventional thin layer surface filters that only filter at the surface. A depth filter according to the present teachings absorbs separation aid, aggregates of separation aid and contaminants, and free contaminants; the absorbed separation aid and aggregates of separation aid and contaminants will contribute to the filtering efficiency and will improve the possibility of also catching very small contaminant particles from the oil. Separation aid, separation aid with attached contaminants, and contaminants will not pass through the filter cake but will instead be integrated into the filter cake and become a part of the filter. Pure oil however passes through the filter cake. The fact that both separation aid and aggregates of separation aid and contaminants make up part of the filter cake together with the filter cake material improves the filtering efficiency when the rest of the mixture of contaminated oil and separation aid later is filtered through the depth filter cake. A very effective filtering of the contaminated oil is provided thereby. The separation aid is designed for attracting contaminants and therefore the filter efficiency is improved. The combination of separation aid and depth filter provide an effective oil purification system; very small contaminant particles also can be filtered by this filtering method. The depth filter is easy to change between batches of oil to purify. Furthermore an automation of the process can easily be achieved, both for the building up of the filter cake and for the changing (replacement) of the filter. Furthermore, if for example a cellulose fiber powder is used for the building of the filter cake, the size, i.e. the depth of the depth filter, can very easily be changed from case to case (e.g., batch to batch) by just adapting the amount of added cellulose fiber powder. A very flexible and effective oil purification method and system is provided thereby.

In one embodiment of the present teachings, said depth filter comprises a cellulose fiber powder and a carrier paper.

In one embodiment of the present teachings, the filtering step may comprise:

building (up) a depth filter by circulating a mixture of cellulose fiber powder and filter building oil over a carrier layer and possibly adding more cellulose fiber powder while continuing to circulate the mixture until a filter cake of the depth filter is large enough for filtering the mixture (batch) of contaminated oil and separation aid;

filtering the mixture through said built (up) depth filter.

In one embodiment of the present teachings, the filtering step may comprise:

transferring first only a portion of said mixture of separation aid and contaminated oil from the mixing tank to the filtering arrangement;

building (up) a depth filter by adding a cellulose fiber powder to said portion of said mixture and circulating said portion of said mixture with added cellulose fiber powder over a carrier layer provided in the filtering arrangement and possibly adding more cellulose fiber powder while continuing to circulate the mixture;

transferring the rest of said mixture to said filtering arrangement; and filtering the rest of the mixture through the built (up) depth filter.

In one embodiment of the present teachings, the step of building (up) a depth filter comprises adding an amount of cellulose fiber powder that is at least 1.5 times the weight of the separation aid provided to (in) the mixing tank or within the interval (range) of 1.5-4 times the weight of the separation aid provided to (in) the mixing tank.

In one embodiment of the present teachings, said filtering arrangement may comprise:

a cellulose fiber mixing vessel arranged for receiving a filter building oil and a cellulose fiber powder;

a cellulose fiber source connected to the cellulose fiber mixing vessel; and a carrier layer connected to the cellulose fiber mixing vessel such that the contents of the cellulose fiber mixing vessel can be circulated over the carrier layer to build (up) a depth filter on the carrier layer, wherein the filtering arrangement is configured to add cellulose fiber powder from the cellulose fiber source to the cellulose fiber mixing vessel while circulating the mixture until a filter cake of the depth filter is large enough for filtering the rest of the mixture of contaminated oil and separation aid held in the mixing tank.

In one embodiment of the present teachings, said cellulose fiber mixing vessel is connected to an outlet from the mixing tank and said system is configured to transfer first only a portion of the mixture from the mixing tank to said filtering arrangement and to transfer said portion of the mixture to said cellulose fiber mixing vessel such that said portion of the mixture serves as the filter building oil. The filtering arrangement is configured to add a cellulose fiber powder from the cellulose fiber source to said portion of the mixture in the cellulose fiber mixing vessel and to circulate said portion of said mixture containing the added cellulose fiber powder over the carrier layer to build up a depth filter. The system is configured to transfer the remaining portion of the mixture from the mixing tank to the filtering arrangement and to filter it through the built (up) depth filter.

In one embodiment of the present teachings, said filtering arrangement is configured to add an amount of cellulose fiber powder to the cellulose fiber mixing vessel during building (up) of a depth filter that is at least 1.5 times the weight of the separation aid provided to the mixing tank or within the interval (range) of 1.5-4 times the weight of the separation aid provided to the mixing tank.

In one embodiment of the present teachings, the method further comprises measuring a degree of contamination of the contaminated oil provided (held) in the mixing tank. Furthermore, the step of building (up) the depth filter comprises adding an amount of cellulose fiber powder that depends on the measured degree of contamination of the contaminated oil held in the mixing tank. In this embodiment the system comprises a sensor for measuring the degree of contamination of the contaminated oil held in the mixing tank. In addition, the filtering arrangement is configured to adapt the amount of cellulose fiber powder provided from the cellulose fiber source to the cellulose fiber mixing vessel in dependence on the measured degree of contamination of the contaminated oil held in the mixing tank.

In one embodiment of the present teachings, the method further comprises warming the contaminated oil and separation aid when provided into the mixing tank. The system comprises in this embodiment a heating device provided to (in) the mixing tank for warming the contaminated oil and separation aid in the mixing tank.

DETAILED DESCRIPTION OF EMBODIMENTS

Figure 1:
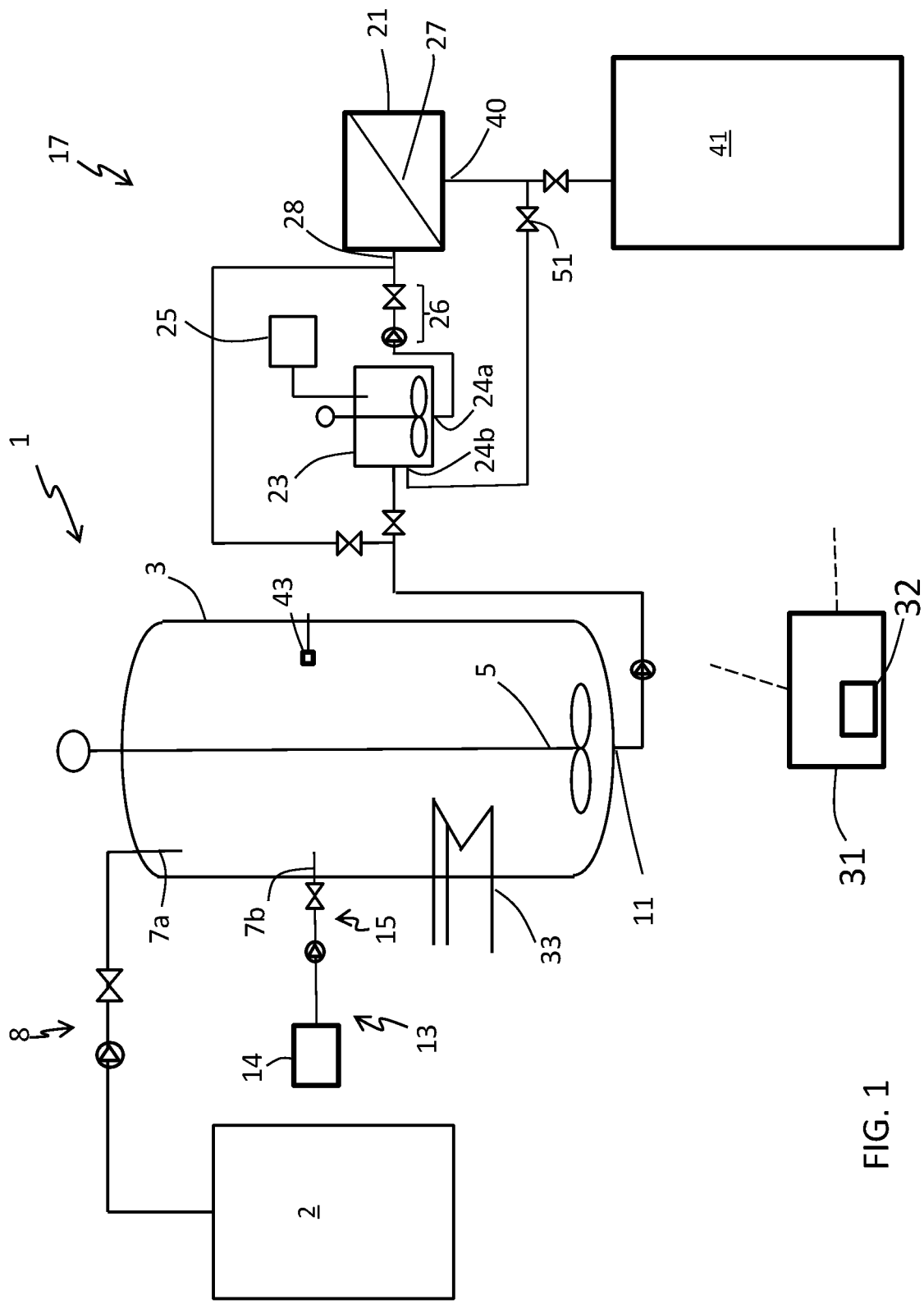
FIG. 1 shows schematically a system for purification of oil according to one embodiment of the present teachings.

FIG. 1 schematically shows a system 1 for purification of oil according to one embodiment of the present teachings. The system 1 comprises a mixing tank 3. Said mixing tank 3 comprises a mixing device 5 for mixing the contents of the mixing tank 3 and at least one inlet 7a, 7b for receiving contaminated oil to be purified and separation aid. Although contaminated oil and separation aid could be provided (supplied) to the mixing tank 3 through one and the same inlet, in this embodiment two separate inlets, i.e. a first inlet 7a and a second inlet 7b, are shown. A feed tank 2 is connected to the first inlet 7a via a feed pump and valve 8. The feed tank 2 contains contaminated oil to be purified. The system 1 could as well comprise more than one feed tank 2. The system 1 further comprises a separation aid dosing device 13 comprising a separation aid tank 14 and a separation aid pump and valve 15. The separation aid dosing device 13 is in this embodiment connected to the second inlet 7b of the mixing tank 3. Hereby contaminated oil and separation aid can be provided to the mixing tank 3 and can be mixed inside the mixing tank 3 into a mixture by the mixing device 5. A heater 33 is provided in this embodiment to (in) the mixing tank 3 but this may not be necessary. Heating the mixture of contaminated oil and separation aid may improve purification efficiency.

The use of a separation aid, which also may be called a chemical booster, for capturing contaminants/impurities in contaminated oil has been described above. A liquid separation aid is added to the oil and mixed therewith and impurities in the oil will be captured by the separation aid. The separation aid is substantially insoluble in the oil, forming a two phase mixture upon mixing and the separation aid attracts impurities in the oil during mixing of oil and separation aid. The separation aid will by chemical interactions absorb contaminating solids, or dissolved impurities in the contaminated target oil. The separation aid should be liquid at the temperature at which the process is carried out.

The separation aid composition should be substantially insoluble in the contaminated target oil, forming a two-phase mixture upon mixing with the contaminated oil. The liquid separation aid can also have a density different from that of the contaminated oil to be purified.

The separation aid is not soluble in the contaminated target oil because of its polar properties and thus colloids consisting of small droplets of the liquid separation aid composition are formed by the stirring. That is, owing to chemical interactions (hydrophilic, hydrophobic, and charge interactions), unwanted solid or dissolved impurities in the contaminated target oil are absorbed by the colloids. In instances where the separation aid has a higher density than the oil, the separation aid will, owing to gravity separation, form a lower phase together with the solid and/or dissolved impurities. In instances where the separation aid has a lower density than the contaminated target oil, it will form an upper phase upon gravity separation.

The liquid separation aid for use in the present teachings can be made up based on the following components: a) a polar polymer; b) a surface active hydrotrope/solubilizer; and, c) a co-tenside.

Suitable separation aids having the properties described above, which can be used in the present teachings, may e.g. constitute a composition comprising a mixture of polar polymers such as polyethylene glycols, polypropylene glycols or similar polyalkylene glycols, organic surface active components having nonionic, anionic, cationic and amphoteric properties with the ability to enhance the solubility of solid or dissolved impurities in the separation aid.

One example of a separation aid which can be used in the present teachings comprises: a) at least one polar polymer not soluble in oil and having a higher density than the oil, such as polyethylene glycol having an average molecular weight of 190-210 g/mole, e.g. Carbowax PEG 200 (Dow Chemical Company); b) at least one surface active hydrotrope/solubilizer, such as anionic sulfonic acids, phosphate ester-based substances or non-ionic surfactants from the poly-glycoside Family, such as Simulsol SL 4, Simulsol SL 7 G and Simulsol AS 48 (Seppic, Air Liquide group); c) at least one amphoteric co-surfactant, such as an propionate type e.g. Ampholak YJH-40 (Akzo Nobel) which is a sodium caprylimino dipropionate.

The mixing tank 3 further comprises at least one outlet 11 for transferring the mixture of contaminated oil and separation aid out from the mixing tank 3.

The system 1 further comprises a filtering arrangement 17 connected to the at least one outlet 11 of the mixing tank 3. The mixture of contaminated oil and separation aid is filtered by said filtering arrangement 17 when transferred out from the mixing tank 3. According to the present teachings the mixture of contaminated oil and separation aid is filtered instead of waiting for a sludge phase to sediment to a bottom of the mixing tank and only filtering an oil phase. The filtering is performed almost directly after mixing of the contaminated oil and the separation aid. Thus, time is saved and a more effective purification process is achieved. The method comprises filtering the mixture in the filtering arrangement 17. In this step both separation aid and contaminants from the contaminated oil will be filtered away and purified oil will be collected in a pure oil tank 41, which is connected to a filter outlet 40 from the filtering arrangement 17. The separation aid will, during the mixing with the contaminated oil in the mixing tank 3, attract contaminants, even very small sized contaminant particles, and these aggregates of separation aid and contaminants will be caught by the filter. Any possible remaining free contaminant particles can also be caught by the filter or by separation aid or by aggregates of separation aid and contaminants already caught in the filter. Thus, a very effective purification process is provided according to this embodiment of the present teachings.

In some embodiments of the present teachings, said filtering arrangement 17 comprises a depth filter 21. A depth filter, which also may be called a filter cake or cake filter, is a filter that can retain impurities within a bulk structure of the filter medium, in contrast to conventional thin layer surface filters that only filter at the surface. The depth filter absorbs separation aid, aggregates of separation aid and contaminants, and contaminants; the absorbed separation aid and aggregates of separation aid and contaminants contribute to the filtering efficiency and will also increase the possibility of catching very small contaminant particles from the oil. Separation aid, separation aid with attached contaminants, and contaminants will not pass through the filter cake but will instead become integrated in the filter cake and become a portion of the filter. Pure oil however passes through the filter cake. The depth filter is easy to change between batches of oil to purify. Furthermore an automation of the process can easily be achieved, both for the building up of the filter cake and for the changing of the filter. Furthermore, if for example a cellulose fiber powder is used for the building (up) of the filter cake, the size, i.e. the depth of the depth filter, can very easily be changed from case to case by just adapting the amount of added cellulose fiber powder. A very flexible and effective oil purification method and system is provided thereby.

In one embodiment of the present teachings, the depth filter 21 can be built up by circulating a mixture of cellulose fiber powder and a filter building oil over a carrier paper 27 and possibly adding more cellulose fiber powder during the circulation until a filter cake of the depth filter 21 is large enough for filtering the mixture of contaminated oil and separation aid. In one embodiment of the present teachings, the filter building oil is a portion of the mixture of contaminated oil and separation aid held in the mixing tank 3. In this embodiment, which is shown in FIG. 1, a portion of the mixture is first transferred to the filtering arrangement 17 to be used for building (up) the depth filter 21; thereafter, the rest of the mixture in the mixing tank 3 is transferred to the filtering arrangement 17 and is filtered through the built depth filter 21. However, in other embodiments another oil can be used as the filter building oil for building (up) the depth filter 21. For example oil could be taken directly from the feed tank 2 or from another source.

In other embodiments of the present teachings, the depth filter can for example be a commercially available cellulose depth filter or cartridge having a high dirt-holding capacity (e.g. CC Jensen, Europafilter, JDI Inc, Lubrigard Ltd, Baldwin, Parker, Eaton). Another alternative would be a dry application of cellulose fiber powder on a carrier paper without the pre mixing of the powder in a filter building oil. This could be done during the process or by prefilling a cartridge or container in advance with a suitable cellulose fiber powder. The fiber sizes and the amount of cellulose fiber powder can then be adapted for different applications, for example for different types of contaminated oil.

In the embodiment of the present teachings shown in FIG. 1, where a portion of the mixture from the mixing tank 3 is used as the filter building oil, the filtering arrangement 17 comprises a cellulose fiber mixing vessel 23 which is connected to an outlet 11 from the mixing tank 3 for receiving a portion of the mixture from the mixing tank 3. The filtering arrangement 17 further comprises a cellulose fiber source 25, which is connected to the cellulose fiber mixing vessel 23, and a carrier layer 27, which is connected to the cellulose fiber mixing vessel 23 such that the contents in the cellulose fiber mixing vessel 23 can be circulated over the carrier layer 27 to build (up) a depth filter 21 on the carrier layer 27.

The filtering arrangement 17 is configured to add cellulose fiber powder from the cellulose fiber source 25 to the cellulose fiber mixing vessel 23 during the circulation until the filter cake of the depth filter 21 is large enough for filtering the rest of the mixture of contaminated oil and separation aid held in the mixing tank 3. A vessel outlet 24a from the cellulose fiber mixing vessel 23 is connected via a pump and valve 26 to a filter inlet 28 of the carrier layer 27 and a filter outlet 40 of the carrier layer 27 is connected back to a vessel inlet 24b of the cellulose fiber mixing vessel 23 via a valve 51. Hereby the contents of the cellulose fiber mixing vessel 23 can be circulated through the carrier layer 27. Furthermore cellulose fiber powder can be added in the cellulose fiber mixing vessel 23 from the cellulose fiber source 25 for each circulation until a suitably sized filter cake has been built up on the carrier layer 27. The size of the filter cake should be based on the amount of contaminated oil to be purified and possibly also on the degree of measured contamination of the contaminated oil. One or more sensors 43 could be provided in the mixing tank 3 for measuring the degree of contamination or a sample could be retrieved from the mixing tank 3 for external measuring.

The amount of cellulose fiber powder to be used for building (up) the depth filter can also be based at least partly on the amount of separation aid provided to the mixing tank 3. For example the amount of cellulose fiber powder added to the cellulose fiber mixing vessel 23 during building up of the depth filter 21 can be at least 1.5 times the weight of the separation aid provided (supplied) into the mixing tank 3 or within the interval (range) of 1.5-4 times the weight of the separation aid provided (supplied) into the mixing tank.

The size of the cellulose fibers in the cellulose fiber powder can also be chosen for providing good oil purification efficiency. A suitable cellulose fiber powder may have a bulk density within the interval (range) of 30-220 g/l and a fiber size distribution that is within 30%-90%>32 μm and 0-30%>90 μm (method: Alpine air draft sieve).

When the depth filter 21 has been built up, the system 1 is configured for transferring the remaining portion of the mixture from the mixing tank 3 to the filtering arrangement 17 and filtering it through the built (up) depth filter 21.

A control system 31 is also provided in this embodiment of the system 1. The control system 31 is connected to pumps, valves and sensors in the system to control the system. The connections between the control system 31 and all the pumps, valves and sensors in the system are not shown. They are just illustrated by two dotted lines from the control system 31. The connections could be both wired connections or wireless connections. The control system 31 can control, for example, the amount of cellulose fiber powder provided into the cellulose fiber mixing vessel 23 during building (up) of a depth filter 21 and the number of times of circulation of the filter building oil and cellulose fiber powder over the carrier layer 27. The control system 31 may furthermore also control pumps and valves for feeding contents into and out from the mixing tank 3.

An advantage of depth filtering is a high dirt holding capacity without clogging due to a greater total filter mass. Using cellulose fiber powder as the filter medium enables absorption and removal of both polar liquid separation aid and water together with solid particles. By decreasing the filtering rate, the contact time increases, thereby giving a higher separation efficiency.

In one embodiment of the present teachings, the filtering arrangement 17 is configured to provide a new depth filter for each batch of mixture of contaminated oil and separation aid to be purified that is received from the mixing tank 3. This provides the advantage that a new fresh depth filter is used each time. A depth filter will also be very effective for filtering out very small particles, here called micro and nano sized particles which are in the size of μm or smaller. When reusing an industrial oil over and over again, it will become more and more important to also be able to get rid of the smallest particles when purifying the oil for the reuse. Otherwise the amount of the smallest particles will grow and they will become an increasing problem in the oil the more times the oil has been purified for reuse. The combination of (i) the separation aid as used in the present teachings for the purification of the oil and (ii) the use of a depth filter is especially effective for the removal of the smallest contaminant particles in the oil because both separation aid and aggregates of separation aid and contaminants will be absorbed in the depth filter, possibly in a top layer of the depth filter. The separation aid itself which is absorbed in the depth filter will, during the filtering of the rest of the mixture of contaminated oil and separation aid, attract and bind possibly remaining free contaminants.

Even the smallest micro and nano sized particles will to a high degree be filtered by such a method according to the present teachings. Upon mixing separation aid with contaminated oil, the separation aid attracts the contaminants and even the smallest sized contaminant particles can be bound to the separation aid. Therefore a large amount of the contaminants will be bound to separation aid in aggregates which are large and which easily get trapped in the filter. Here, it is noted that the filter does not necessarily need to be a fine filter, but can be a cheaper type of filter. The filtration quality will still be very good and also very small contaminant particles will be filtered away. Any possible remaining free contaminants can also get caught, as explained above, owing to the separation aid and aggregates of separation aid and contaminants that have been absorbed in the depth filter. The forcing of the mixture of contaminated oil and separation aid through the depth filter can be performed in different ways, for example by providing a pressure from above or a vacuum from below the carrier layer. After the filtering of one batch of contaminated oil, the depth filter can be disposed of and a new depth filter can be provided according to the same procedure as described above. This type of depth filter using a cellulose fiber powder for building (up) a depth filter is a very cost effective type of filtering. Furthermore it is a very flexible filtering method because the thickness of the filter can be easily adapted from time to time by changing the amount of cellulose fiber powder added for building (up) the filter. It is also very easy to change the filter from time to time, for example between each batch of contaminated oil to purify and both this changing of the filter and the process for building (up) the filter can easily be performed as an automated process.

Tests have been performed for measuring the effectiveness of filtering using a depth filter in combination with the purification method using the separation aid as described above. From these tests it is clear that the method is very effective and even very small sized particles are effectively removed. Details are given below from two example tests:

1. A mineral based hydraulic oil, Exxon Mobil DTE 25, was treated according to the present teachings. The separation aid was mixed in to the hydraulic oil in a mixing tank and stirred for 1 hour. Cellulose filter powder having a bulk density 35 g/l and a fiber size distribution of 85%>32 um and 50%>90 um, was added into a small portion of the separation aid and oil mixture and passed through a carrier paper creating a filter cake having a height of 6 cm. The oil mixture with the separation aid was then filtered through the built (up) depth filter. The cleaning efficiency was evaluated by measuring the number of particles using image analysis (ISO 4406:87) before and after the cleaning. The filtering reduced the number of particles by 99%, specifically from 1041 particles/ml (ISO-code 17/16/16) down to 9 particles/ml (ISO-code 10/8/7).

2. A sample of a virgin mineral based hydraulic oil, RecondOil ROCCO Hydraulic HLP 46, was taken from a metal drum and treated according to the present teachings. The separation aid was mixed in the hydraulic oil in a mixing tank and stirred for 4 hours. Cellulose filter powder having a bulk density of 55 g/l and a fiber size distribution of 75%>32 um and 10%>90 um was added to a small portion of the separation aid and oil mixture and passed through a carrier paper creating a filter cake having a height of 9 cm. The oil mixture with the separation aid was then filtered through the built (up) depth filter. The cleaning efficiency was evaluated by measuring the number of particles using image analysis (ISO 4406:87) before and after the cleaning. The filtering reduced the number of particles by 98%, specifically from 105 particles/ml (ISO-code 14/12/11) down to 2.1 particles/ml (ISO-code 8/7/6).

Figure 2:
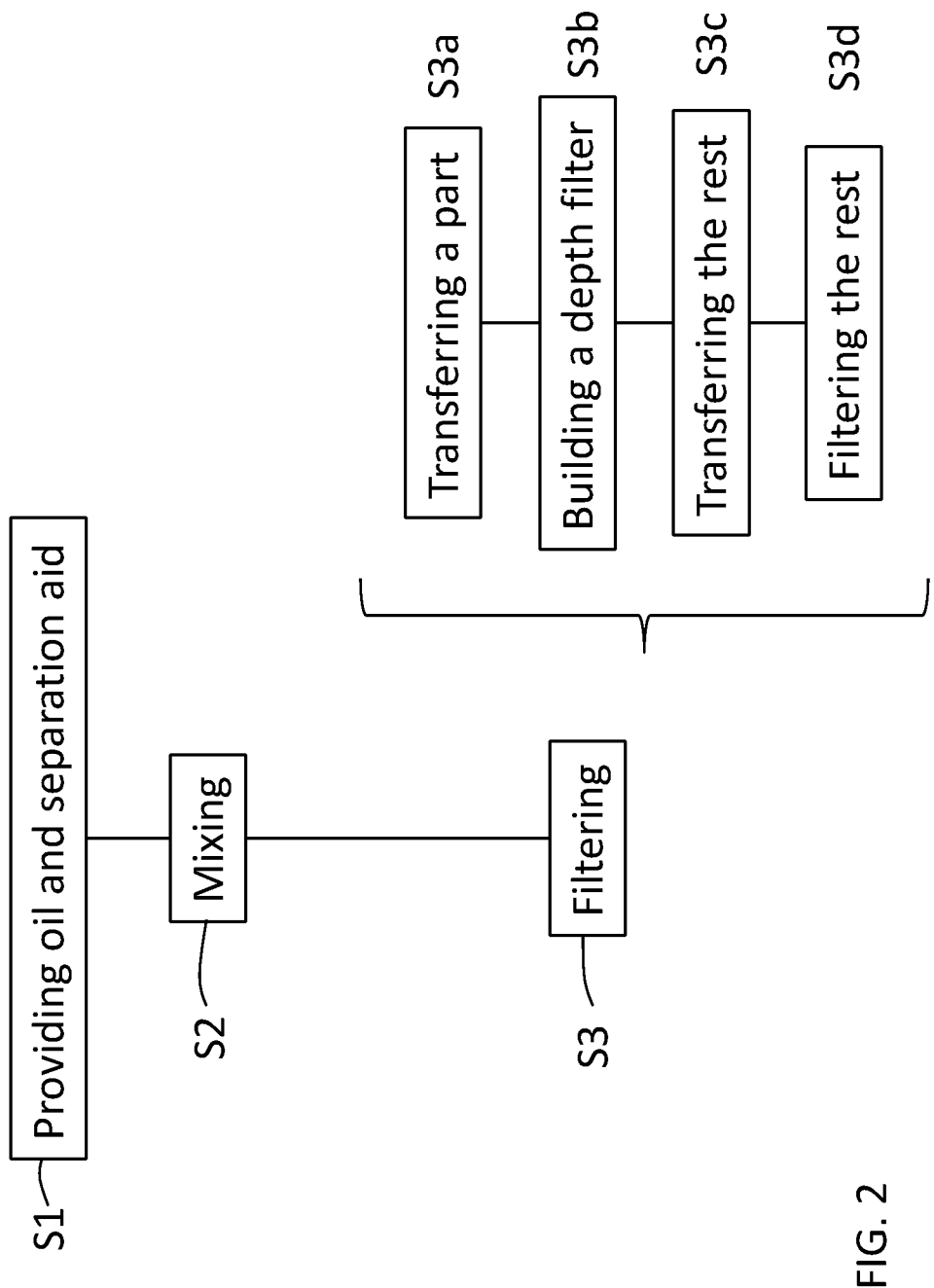
FIG. 2 is a flow chart of a method according to one embodiment of the present teachings.

FIG. 2 is a flow chart of a method according to one embodiment of the present teachings. The steps are described in order below:

S1: Providing contaminated oil and a separation aid to a mixing tank 3.

S2: Mixing said separation aid and contaminated oil into a mixture.

S3: Filtering said mixture. The mixture is transferred out from the mixing tank to a filtering arrangement 17 where it is filtered. In some embodiments of the present teachings, said step of filtering comprises filtering said mixture through a depth filter 21 as has been described above. Said depth filter 21 can be built for each batch of contaminated oil to be purified. Building a depth filter 21 can for example be done by circulating a mixture of cellulose fiber powder and filter building oil over a carrier paper 27 and possibly adding more cellulose fiber powder during the circulation until the filter cake of the depth filter 21 is large enough for filtering the mixture of contaminated oil and separation aid, i.e. the batch of contaminated oil held in the mixing tank 3 together with the separation aid. A filter building oil can be a small portion of the contaminated oil to be purified or a small portion of the mixture of the contaminated oil and separation aid from the mixing tank 3. Another specifically dedicated filter building oil could alternatively also be used for the building (up) of the depth filter 21. Alternatively a commercially available depth filter can be used or a depth filter can be built by dry application of cellulose fiber powder on a carrier paper as explained above.

In one specific embodiment the step S3 of filtering comprises the steps:

S3a: Transferring first only a portion of said mixture of separation aid and contaminated oil from the mixing tank 3 to the filtering arrangement 17.

S3b: Building (up) a depth filter 21 by adding a cellulose fiber powder to said portion of said mixture and circulating said portion of said mixture with added cellulose fiber powder over a carrier layer 27 provided in the filtering arrangement 17 and possibly adding more cellulose fiber powder during the circulation.

S3c: Transferring the rest of said mixture to said filtering arrangement 17.

S3d: Filtering the rest of the mixture through the built (up) depth filter 21.

In some embodiments of the present teachings, the method further comprises measuring the degree of contamination of the contaminated oil provided to the mixing tank 3. In such embodiments the step of building (up) a depth filter 21 may comprise adding an amount of cellulose fiber powder that is dependent on the measured degree of contamination of the contaminated oil provided to the mixing tank.

In some embodiments of the present teachings, the method further comprises warming the contaminated oil and separation aid in the mixing tank 3. By warming the contents of the mixing tank 3, binding of contaminants to the separation aid may be improved and speeded up and also the filtering may be more effective if the mixture is warm.

A computer program product is furthermore provided. Said computer program comprises instructions which, when executed in a processor 32 in the control system 31 in the system 1 for purification, cause the control system to control the flows in the system as described above. The computer program comprises at least instructions, which when executed in the processor 32 in the control system 31, cause the control system to control the system to perform the method according to the steps S1-S3 as described above. In one specific embodiment S3 comprises S3a-S3d.

The invention claimed is:

1. A method for purifying a contaminated oil, comprising:
mixing a liquid composition that is at least substantially insoluble in oil with the contaminated oil to form a two-phase mixture containing an oil phase and a polar phase, whereby the polar phase absorbs contaminating solids and/or dissolved impurities in the contaminated oil, and
separating the oil phase of the two-phase mixture from the polar phase;
wherein the liquid composition comprises a polar polymer, a surface active hydrotrope/solubilizer, and a co-tenside.

2. The method according to claim 1, wherein the polar polymer comprises a polyalkylene glycol.

3. The method according to claim 1, wherein the polar polymer comprises a polyethylene glycol or a polypropylene glycol.

4. The method according to claim 1, wherein the polar polymer comprises a polyethylene glycol.

5. The method according to claim 4, wherein the polyethylene glycol has an average molecular weight of 190-210 g/mole.

6. The method according to claim 1, wherein the surface active hydrotrope/solubilizer comprises an anionic sulfonic acid, a phosphate ester or a non-ionic poly-glycoside surfactant.

7. The method according to claim 6, wherein the polar polymer comprises a polyalkylene glycol.

8. The method according to claim 6, wherein the polar polymer comprises a polyethylene glycol.

9. The method according to claim 8, wherein the polyethylene glycol has an average molecular weight of 190-210 g/mole.

10. The method according to claim 9, wherein the at least one amphoteric co-surfactant comprises sodium caprylimino dipropionate.

11. A liquid composition comprising a polar polymer, a surface active hydrotrope/solubilizer, and sodium caprylimino dipropionate.

12. The liquid composition according to claim 11, wherein the surface active hydrotrope/solubilizer comprises an anionic sulfonic acid, a phosphate ester or a non-ionic poly-glycoside surfactant.

13. A method for purifying a contaminated oil, comprising:
  mixing a liquid composition with the contaminated oil to form a two-phase mixture containing an oil phase and a polar phase, and
  filtering the two-phase mixture such that the oil phase passes through a filter and the polar phase and contaminants are retained in the filter;
  wherein the liquid composition comprises a polar polymer, a surface active hydrotrope/solubilizer, and a co-tenside.

14. The method according to claim 13, wherein the filter is a filter cake.

15. The method according to claim 14, wherein the cake filter is composed of a polar filter material.

16. The method according to claim 15, wherein the cake filter is composed of cellulose fiber.

17. The method according to claim 16, wherein the polar polymer comprises a polyalkylene glycol.

18. The method according to claim 17, wherein the surface active hydrotrope/solubilizer comprises an anionic sulfonic acid, a phosphate ester or a non-ionic poly-glycoside surfactant.

19. The method according to claim 18, wherein the polyalkylene glycol has an average molecular weight of 190-210 g/mole.

20. The method according to claim 19, wherein the co-tenside comprises sodium caprylimino dipropionate.

* * * * *